July 12, 1949.
H. F. PETERS
2,475,855
CATALYTIC REACTION APPARATUS
Filed Oct. 13, 1947
2 Sheets-Sheet 1
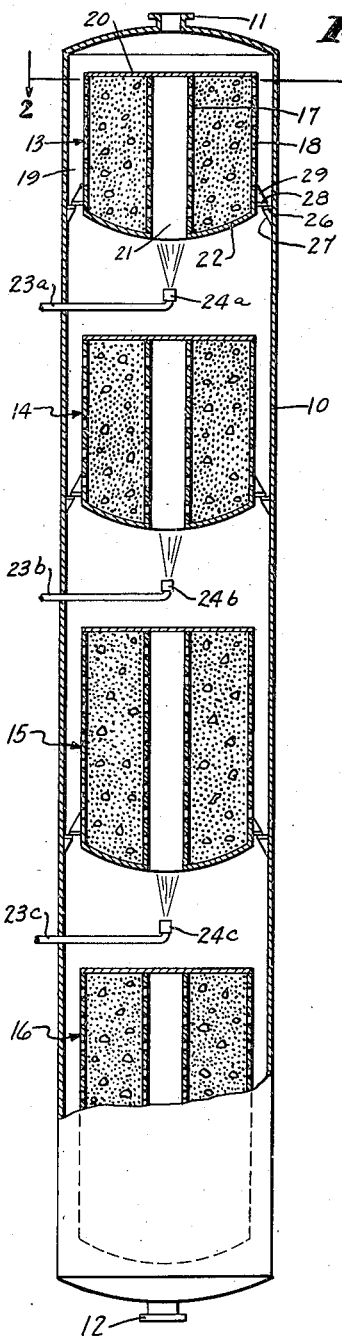
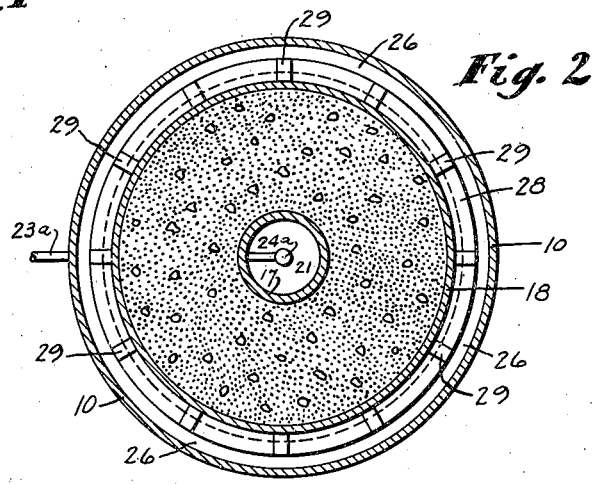
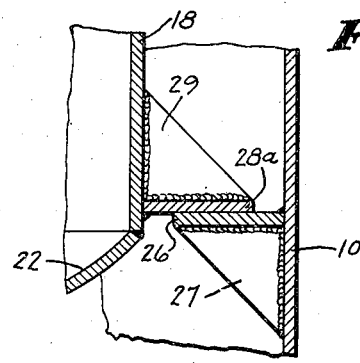
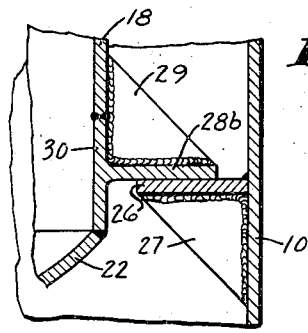
INVENTOR.
HARRY F. PETERS
BY
Busser and Harding
ATTORNEYS

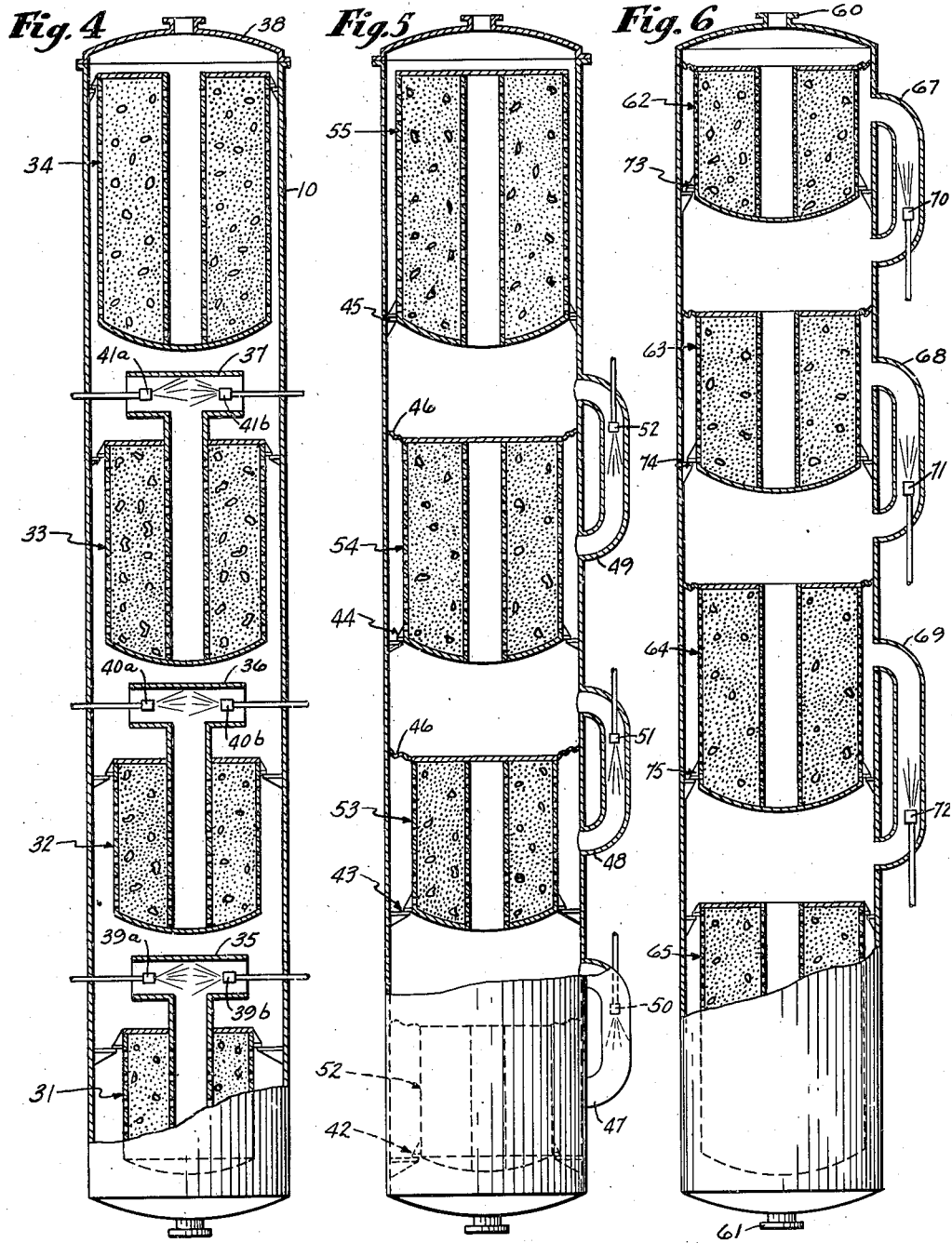

Patented July 12, 1949

2,475,855

UNITED STATES PATENT OFFICE 2,475,855

CATALYTIC REACTION APPARATUS

Harry F. Peters, Haddonfield, N. J., assignor to Sun Oil Company, Philadelphia, Pa., a corporation of New Jersey Application October 13, 1947, Serial No. 779,518

3 Claims. (Cl. 23—288)

This invention relates to improved apparatus for conducting catalytic reactions and more particularly to apparatus for carrying out catalytic processes involving alternate endothermic and exothermic reactions. A typical process of this type is the catalytic conversion of hydrocarbons in a cyclic operation, wherein hydrocarbons are caused to react endothermically in the presence of a catalytic contact mass, causing deposition of carbonaceous deposits on the mass which reduce the catalytic activity, and the catalyst is then reactivated by burning off the carbonaceous material. The catalytic cracking of higher boiling hydrocarbons to lower boiling hydrocarbons is a specific example of this type of process. Other examples are reforming, dehydrogenation and the like.

More specifically, the present invention is concerned with an improved catalytic reactor for use in a stationary bed type of operation, wherein the catalyst is employed in the form of a plurality of stationary beds within the reactor and is regenerated periodically in situ by passing hot oxygen-containing gases through the several beds. The reactor is especially adapted for use in that type of catalytic conversion generally referred to in the art as adiabatic operation. By this is meant that both the endothermic and exothermic reactions are carried out without the use of a circulating convective field for supplying heat to, or removing heat from, the reaction zone by indirect heat transfer. In other words, in such adiabatic operation the heat required for the endothermic reaction is supplied either as sensible heat of the reactants entering the reaction zone or as heat stored in the contact mass during the previous regeneration period, while the heat evolved during the exothermic reaction either is stored in the contact mass for use in the subsequent on-stream period or else is removed from the reaction zone in the form of sensible heat of the effluent regeneration gases. The reaction apparatus according to the present invention is especially adapted for storage within the contact mass of a large proportion of the exothermic heat evolved during the regeneration period for use during the subsequent on-stream period. The apparatus is adapted for the utilization of this stored heat not only as heat of reaction but also as heat for evaporating hydrocarbon charge material introduced between the several beds of catalytic contact mass during the subsequent on-stream period.

The features and advantages of the invention can best be understood by reference to the accompanying drawings, in which:

Figure 1 is an elevational view, partly in section, of one form of the improved catalytic reactor;

Figure 2 is a top view of the reactor on the line 2—2 of Figure 1;

Figures 3—A and 3—B are details of means for supporting the catalyst trays within the reactor;

Figure 4 is an elevational view, partly in section, of a modified form of the reactor including an improved internal spray arrangement;

Figure 5 is an elevational view, partly in section, of another modified form of the reactor including external means for flowing reactants from one tray to the next; and Figure 6 is an elevational view, partly in section, of still another modification of the reactor including external flow means.

Referring first to Figures 1 and 2 of the drawings, the reactor comprises a vertically elongated cylindrical outer shell 10 having an inlet connection or nozzle 11 at the top and an outlet connection or nozzle 12 at the bottom. A plurality of trays are positioned within the shell in superposed relation for maintaining several separate beds of catalytic contact material. For purpose of illustration, the reactor is shown in Figure 1 as having four such beds indicated generally at 13, 14, 15 and 16, but it will be understood that any suitable or desired number of beds may be provided. The trays are annular shaped and are positioned essentially concentric to the outer shell 10 and in spaced apart relation to each other. Since all of the trays may be of similar construction the following description thereof is made with specific reference only to the top tray.

Each of the trays comprises an inner wall 17 which is continually perforated to permit flow of fluid therethrough and an outer wall 18, likewise perforated, which is of lesser diameter than the shell 10 so as to provide an annular space 19 between the outer wall 18 and the shell. An imperforate cover member 20 extends over the top of the tray and also serves to close off the top of the central space 21 within the tray. Each tray is constructed with a convex bottom formed by means of an imperforate convex bottom member 22. This arrangement permits the weight of the bed of contact material to be carried on the bottom of the tray without direct support from beneath. Convex bottom member 22 has an opening in its center corresponding to central space 21 within the tray so as to permit fluids passing from the bed into the central space to flow therefrom downwardly to the next bed of contact material.

The trays are supported within the reactor by circumferential support means positioned within the outer annular space 19 between the tray and the shell 10 at or near one end of the annular space. As shown in Figure 1, the support means are positioned at the bottom of the annular space. Such support means are adapted not only to support the weight of the tray and the contact material therein upon the outer shell but also to close off annular space 19 at its bottom in order to direct the flow of reactants in the desired manner through the bed. As illustrated in more detail in Figures 3—A and 3—B, such support means may comprise a lower support ring 26 welded to the outer shell 10 and reinforced by means of a plurality of suitable braces 27 positioned around the inside of outer shell 10, and an upper support ring, illustrated at 28, which is secured to the outer wall 18 of the tray and is likewise provided with a plurality of braces 29. As shown in Figure 3—A the upper support ring 28—a may be welded to the outer wall 18 of the tray; or in another form as shown in Figure 3—B, the upper support ring 28—b may be formed as an integral part of a circular member 30 which is adapted to serve as a portion of the outer wall of the tray. In this second form wall member 30, carrying support ring 28—b as an integral part thereof, is welded to the bottom of outer perforate wall 18 and also to convex bottom member 22. The upper support ring 28 is adapted to rest upon the lower support ring 26 so as to carry the weight of the tray and bed of contact material upon the outer shell 10 and also to close off the bottom of the annular space between the tray and the outer shell to prevent reactants from flowing around the bed rather than through it. The elimination of any necessity for beams or other support means positioned beneath the trays is one of the distinctly advantageous features resulting from the above described arrangement.

The trays are filled with a granular contact material which preferably is a mixture of catalyst (for example, a silica-alumina type catalyst if the reaction to be conducted is the cracking of hydrocarbons) and a granular inert material of high heat absorbing capacity (for example, artificially fused oxide such as described in Houdry Patent No. 2,414,812). The proportion of catalyst to heat absorbing material may vary widely depending upon the particular materials used and the amount of heat that it is desired to store in the contact mass during each cycle, but generally will be within the range of 1:5 to 3:1. With the tray construction as shown in Figure 1 and with the general direction of reactant flow from top to bottom of the reactor, it will be apparent that the flow of reactants through each bed will be in a generally horizontal direction inwardly. Thus, reactants will enter each bed from the annular space 19 through the perforations in outer wall 18 and will leave each bed by issuing through the perforations in inner wall 17 into the central space 21, thence flowing downwardly to the next lower bed and passing therethrough in like manner.

In the space between adjacent beds of catalytic contact material, means are provided for introducing additional amounts of reactants into the vapor stream in the form of a fine liquid spray. Such means may comprise inlet lines 23—a, 23—b and 23—c having liquid spray nozzles 24—a, 24—b and 24—c, respectively, preferably pointing upwardly toward the central space of the tray above so as to provide intimate contact between the injected liquid spray and the vapors flowing down from the tray above before the mixture passes to the next lower tray.

It will be noted that the catalyst beds 13, 14, 15 and 16 are of different heights, increasing in the direction of flow through the reactor. This is distinctly preferable in order to compensate for the additional reactants introduced as spray between the beds so that the space velocities of reactants passing through the several catalyst beds will be about the same. In operation, during the on-stream or endothermic reaction period, hydrocarbon reactants are introduced into the top of the reactor through inlet 11 and pass into the outer annular space 19 and inwardly through the uppermost catalyst bed 13 and into the central space 21. In passing through bed 13 the reactants will absorb heat from the contact material in excess of that necessary for the endothermic conversion reaction and accordingly the hydrocarbons flowing into central space 21 will be at a higher temperature than the reactants entering bed 13. The temperature will also be higher at this point than desired for reaction in the next lower catalytic bed 14. This excess heat in the reactants from bed 13 is utilized to vaporize the liquid reactants injected through line 23—a and spray nozzle 24—a so that the temperature of the mixture passing to bed 14 will be at the desired value. The resulting vapor mixture then passes through bed 14 where heat is again picked up in excess of that necessary for maintaining the catalytic conversion reaction, and after passing through the bed the vapors commingle with the next liquid spray introduced through line 23—b and spray nozzle 24—b. Liquid reactants are injected at this point again in sufficient amount to reduce the temperature of the mixture passing to bed 15 to the desired value. The mixture then flows through bed 15 where absorption of heat is again in excess of that necessary for the reaction, and the resulting reactants are again cooled after leaving bed 15 by admixture with a third liquid spray introduced through line 23—c and spray nozzle 24—c before passing to catalytic bed 16, etc.

By way of example, in the catalytic cracking of hydrocarbons the reactants flowing to bed 13 may have a temperature of say 800–900° F.; whereas the hydrocarbons issuing from bed 13 into central space 21 may have a temperature of 1000–1100° F. Sufficient liquid reactants, at a temperature of say 200–600° F., may be introduced as quenching material through spray nozzle 24—a to cause the resulting vapor mixture passing to bed 14 to have a temperature of 800–900° F. Upon passing through bed 14, the mixture will absorb sufficient heat to reach a temperature again of 1000–1100° F. Similar fluctuations in temperature will occur as the reactants pass downwardly through the reactor and alternately come in contact with the spray streams and the other catalytic contact masses.

After the catalyst has become sufficiently inactivated due to deposition of carbonaceous material in the contact mass, the on-stream operation is stopped and the reactor is purged with an inert gas (e. g. steam) or evacuated to remove oil vapors. The catalyst is then regenerated by blowing an oxygen-containing gas such as air or flue gas through the beds in any known or suitable manner to burn off the carbonaceous matter. During the regeneration, heat is stored in the masses of contact material for utilization during the subsequent on-stream operation as heat of reaction and as heat for vaporizing the hydrocarbon liquids injected between beds.

Figure 4 illustrates another form of the invention involving several modifications. In this case the reactor inlet is at the bottom while the outlet is at the top, and the catalyst beds, illustrated generally at 31, 32, 33 and 34, are of increasing height in the direction from bottom to top of the reactor. The trays are of the same general design as described in connection with Figure 1; but in the present modification the central space within each tray is open at the top but closed at the bottom. Circumferential support means, such as shown in Figure 3—A or Figure 3—B, are provided for each tray, but in this case the support means are positioned at the top of the annular spaces adjacent the trays rather than at the bottom. Thus, the reactants will flow around the bottom of each tray into the annular space between the tray and the outer shell 10, thence radially inward through the bed and into the central space and then out of the central space at the top of the tray. Another feature of the present modification is that the trays also vary progressively in diameter with the lowermost tray having the smallest diameter and the uppermost tray the largest. The upper support rings, which are secured to the trays to form a portion of the circumferential support means, also increase in outside diameter from the lowermost tray to the uppermost tray; and each of these support rings has an outside diameter which is less than the inside diameter of the lower support ring which is positioned adjacent the tray next thereabove. This arrangement permits the trays to be removed from the outer shell 10 in case it should become desirable to do so for any reason, by removing the upper head portion 38 of the shell and then withdrawing the trays successively from the top of the reactor.

Still another feature of the modified form of reactor shown in Figure 4 comprises an improved means for introducing the liquid reactants as spray between the beds. As shown in Figure 4, a T-shaped conduit member is connected to the top of each tray (except the uppermost tray) so as to form an extension of the inner perforate wall of the tray, these members being illustrated generally at 35, 36 and 37. Spray nozzles for introducing liquid reactants are positioned within the arms of the T-shaped member in such manner that the spray streams will be injected therein against each other. Thus, spray nozzles 39—a and 39—b are oppositely disposed within member 35, spray nozzles 40—a and 40—b are oppositely disposed within member 36 and spray nozzles 41—a and 41—b are similarly positioned within member 37. This arrangement permits the T-shaped members to serve as spray chambers and causes a more effective contacting of the liquid spray with the vapors, thereby insuring more rapid vaporization of the injected liquid reactants. Another advantage is that contact between the relatively cold liquid spray and the hot metal of the trays or the outer shell is prevented, thereby reducing the stress or strain to which the equipment may be subjected due to temperature changes. Suitable provisions should be made, of course, for permitting removal of the spray nozzles and connecting lines from the reactor for inspection and also to facilitate withdrawal of trays from the reactor whenever it becomes desirable to remove the trays.

It is apparent that the flow of reactants through the reactor illustrated in Figure 4 will be from the side annular space of each tray through the bed in a generally horizontal direction and into the central space within the tray, thence upwardly through the T-shaped spray chamber to the side annular space of the next higher tray, etc.

Figure 5 shows another modification wherein the general direction of flow of the reactants is again from bottom to top of the reactor as in Figure 4. Likewise the trays, indicated generally at 52, 53, 54 and 55, increase both in height and in diameter from bottom to top of the apparatus. Also, the circumferential support means are of the type described in connection with Figure 4, the upper support ring for each tray being of smaller outside diameter than the inside diameter of the lower support ring adjacent the next higher tray in order to permit a tray to pass through any of the lower support rings for the trays thereabove so that the trays may be withdrawn from the top of the apparatus. In the present modification, however, the circumferential support means for the trays (indicated generally at 42, 43, 44 and 45) are positioned at the bottom of the annular spaces between the trays and the outer shell rather than at the top. The top of the annular space adjacent each tray (except the uppermost tray) is closed by a circular member 46, which preferably is designed to function also as an expansion joint to allow for changes in temperature within the apparatus. Member 46 need not be described in detail, inasmuch as such expansion joints are well known to the art.

Referring further to Figure 5, the central space within each tray is closed at the top but open at the bottom in the same manner as shown in Figure 1. Conduit means positioned externally of the reactor are provided for the flow of fluid from the annular space adjacent each bed to the space within the reactor between the bed and the next higher bed. Thus, conduit 47 provides communication from bed 52 to bed 53; conduit 48 likewise provides communication between bed 53 and bed 54; and conduit 49 similarly serves as a passageway for the flow of vapors from bed 54 to bed 55. Spray nozzles 50, 51 and 52 are positioned, respectively, in conduits 47, 48 and 49 to provide for the introduction of liquid reactants as a spray into the vapor streams flowing between beds.

In the reactor of Figure 5, the flow of reactants will be into the bottom of the central space within each tray and then through the bed in a generally horizontal direction to the side annular space, thence through the external conduit leading to the next higher bed and into the central space within such next higher bed, etc.

Figure 6 shows another modification of the reactor which is similar to the modification of Figure 5 but in which the vaporous reactants are introduced at the top of the reactor through nozzle 60 and flow downwardly and out through nozzle 61 at the bottom. The catalyst trays, indicated generally at 62, 63, 64 and 65, increase in height in the direction from the uppermost to the lowermost tray. The central space within each tray is open at the top but is closed at the bottom by means of the convex bottom member of the tray. The annular space adjacent each tray is closed at the top by means of suitable expansion joints 46, except in the case of the bottom tray 65 where the top of the annular space is closed by means of the circumferential support means shown at 66; while the bottom of each annular (except for the lowermost tray) is closed by means of the circumferential support rings indicated generally at 73, 74 and 75. Conduits 67, 68 and 69 provide passageways for the flow of reactants from the side annular spaces adjacent the beds to the space above the next lower bed. Spray nozzles 70, 71 and 72 are positioned within conduits 67, 68 and 69, respectively, for introducing the liquid spray streams into and against the vapor streams flowing within the conduits.

It is apparent that the reactant vapors will pass through the reactor of Figure 6 by flowing downwardly into the central annular space of the upper bed, passing radially outward through the bed into the side annular space and then flowing through the external conduit to the central space of the next lower bed, etc.

It will be understood that in the above description various details of construction representing good engineering practice have been omitted, since they will be readily apparent to one skilled in the art. For instance, it is apparent that suitable manholes may be provided for access to the inside of the reactor and that means should be provided for filling and emptying the trays with contact materials. Likewise, suitable insulating means should be included. Also, it will be understood that the drawings are merely representative of certain embodiments and that numerous specific modifications may be made without departing from the scope of the invention.

Having described my invention, what I claim and desire to protect by Letters Patent is:

1. Catalytic reaction apparatus for conducting alternate endothermic and exothermic reactions which comprises a vertically elongated cylindrical outer shell having an inlet and an outlet at opposite ends thereof, a plurality of annular shaped trays superposed within said shell essentially concentric thereto and in spaced apart relation to each other and adapted each to retain a bed of granular contact material, each of said trays comprising an outer perforate wall of lesser diameter than said outer shell so as to provide an annular space at the outer side of the tray and an inner perforate wall defining the inner side of the tray, an imperforate top cover member for each tray, an imperforate convex bottom member for each tray adapted to carry the weight of the bed without direct support from beneath the bed, circumferential support means for each tray positioned within said outer annular space at one end thereof and adapted to support the weight of the tray upon said outer shell and also to close off said outer annular space at said one end thereof, means for directing the flow of reactants so as to cause the reactants to enter each bed from one of the side spaces and flow therethrough in a generally horizontal direction to the other side space and thence to the inlet side space adjacent the next bed and spray means positioned in the path of flow between trays for introduction of liquid reactants into the flowing stream in the form of a fine spray.

2. Apparatus according to claim 1 wherein each of said circumferential support means comprises a support ring secured to said outer shell and having an inner diameter greater than the outer diameter of the tray which it supports and a second support ring secured to the outer wall of the tray and having an outer diameter greater than the inner diameter of the first-named support ring, said second support ring being adapted to rest upon the first-named support ring.

3. Apparatus according to claim 1 wherein each tray has an outer diameter less than that of the tray next thereabove and wherein each of said circumferential support means comprises a support ring secured to said outer shell and having an inner diameter greater than the outer diameter of the tray which it supports and a second support ring secured to the outer wall of the tray and having an outer diameter greater than the inner diameter of the first-named support ring but less than the inner diameter of the first-named support ring which is adjacent the tray next thereabove, said second support ring being adapted to rest upon the first named support ring.

HARRY F. PETERS.

No references cited.